June 20, 1944.    J. F. O'BRIEN    2,351,630
ELECTRICITY CONDUCTOR UNIT
Filed April 26, 1941
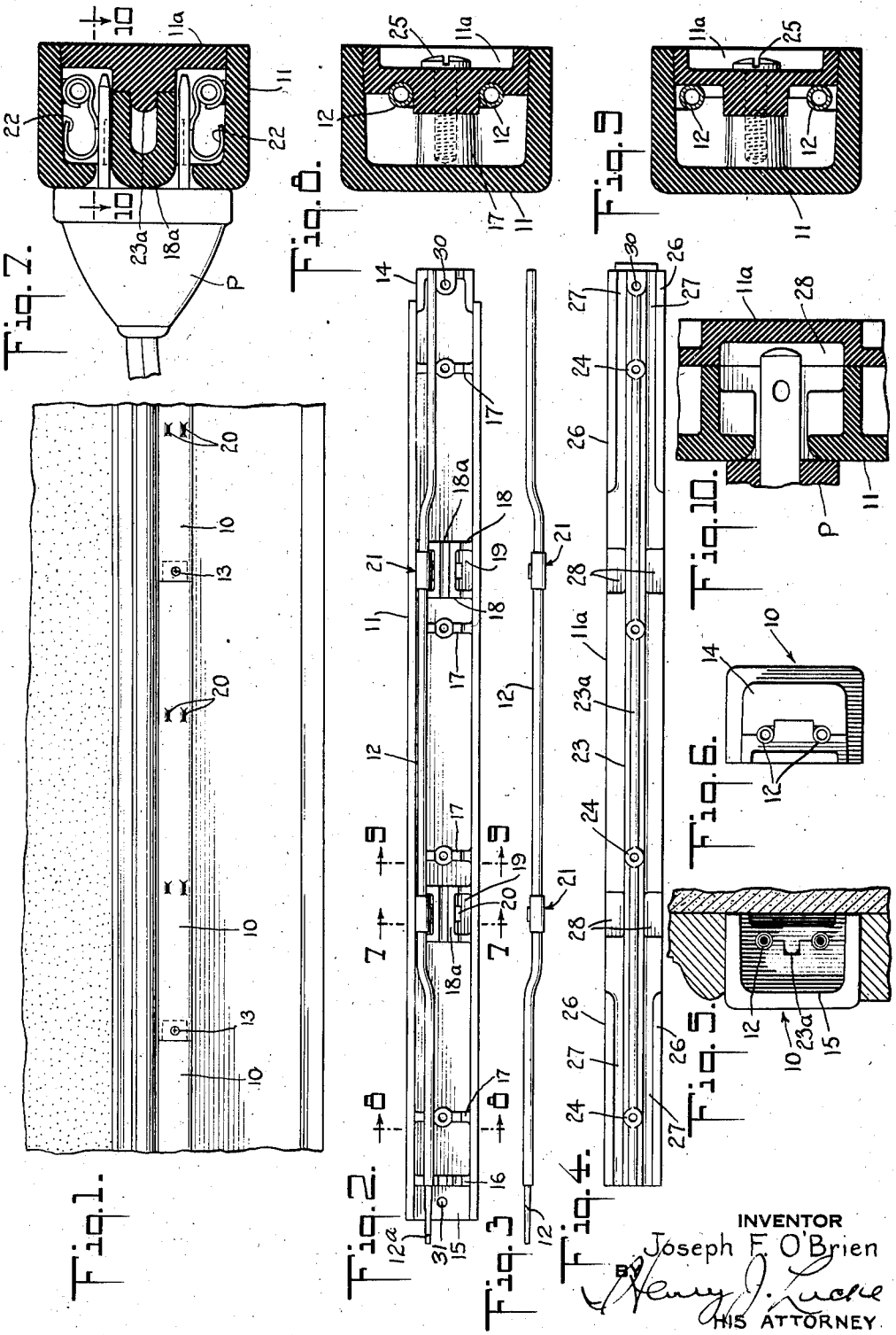
INVENTOR
Joseph F. O'Brien
BY
Henry J. Lucke
HIS ATTORNEY Patented June 20, 1944

2,351,630

UNITED STATES PATENT OFFICE 2,351,630

ELECTRICITY CONDUCTOR UNIT

Joseph F. O'Brien, Jersey City, N. J., assignor to John B. Pierce Foundation, New York, N. Y., a corporation of New York Application April 26, 1941, Serial No. 390,455

4 Claims. (Cl. 173—334.1)

This invention relates to an improved conductor unit for an electrical wiring system.

An object of the invention is to provide an improved unit wherein preferably tubular electricity conductors extend longitudinally within a substantially hollow body, and are arranged for seriatim interconnection with like units, and for interconnection with an electrical attachment plug or like conventional device.

An object of the invention is to provide an improved electricity conductor unit adapted for installation on the baseboard or like structural trim of a room, said unit having an overall depth not substantially greater than the thickness of a conventional baseboard so that such conductor unit will be practically flush with the surface of the baseboard to minimize possibility of damage to the conductor unit and to render inconspicuous the completed installation.

An object of the invention is to provide an improved electricity conductor unit having facilities for connection with the blades of an electrical attachment plug, the conductors within the unit being so arranged that danger of short circuiting or electrical leakage from one to another of the unit conductors is eliminated.

Another object of the invention is to provide an electricity conductor unit, the conductors of which are adapted for seriatim electrical interconnection with the conductors of an adjacent unit by inserting an end portion of the conductors of one unit within the preferably tubular conductors of such adjacent unit, and to provide means for restraining the electricity conductors of one unit against lateral displacement during such insertion.

Other features and advantages of the invention will hereinafter appear.

In the accompanying drawing:

Fig. 1 is an elevation of a portion of an electricity conductor system embodying the present invention, illustratively installed at the baseboard of a room;

Fig. 2 is a plan view, taken from the rear, of a portion of an improved conductor unit incorporating the present invention;

Fig. 3 is a plan view of an electricity conductor therefor;

Fig. 4 is a plan view of the closure member for the conductor unit;

Fig. 5 is an end elevation of a conductor unit at the socket end thereof;

Fig. 6 is an end elevation of a conductor unit at the opposite end thereof;

Fig. 7 is an enlarged sectional elevation of an assembled conductor unit taken at station 7—7 of Fig. 2;

Fig. 8 is an enlarged sectional elevation of an assembled unit taken at station 8—8 of Fig. 2;

Fig. 9 is a sectional elevation of an assembled unit taken at station 9—9 of Fig. 2; and Fig. 10 is an enlarged sectional elevation of a portion of a conductor unit, represented at 10—10 of Fig. 7.

Figure 1 illustrates a portion of an electric wiring system incorporating a plurality of electricity conductor units 10, 10, 10, electrically and mechanically interconnected in seriatim and positioned at the baseboard of a room. Each conductor unit 10 may comprise a body 11 and a complementary base 11a, said base desirably fitting internally of the side walls of said body 11, as illustrated in Figures 7 through 9, inclusive.

The extreme width of such body 11 is preferably not much greater than the width of a conventional attachment plug P, see Figure 7, and the overall depth of the unit 10 is only slightly greater than the thickness of a conventional baseboard or like molding, usually ¾". Such economy of space may be realized by so positioning the electricity conductors 12 of a unit that the blades of the attachment plug pass to the inner sides thereof, see Fig. 7.

The units 10 are adapted for mechanical and electrical seriatim assembly and advantageously incorporate male and female terminals to completely enclose the areas of connection of the conductors 12, 12 of successive units and articulate the interconnected units by a single screw 13, Fig. 1, which may be a wood screw passing through openings provided in the interconnected units and penetrating wooden studding or like building element. Accordingly, the screws 13 may be spaced 16" on centers, to conform to the standard spacing of studding. The male terminus 14 of a unit includes top and side walls which are in effect a continuation of the inner wall surface of the body 11, and the inner boundary of the female terminus 15 may be defined by a transverse wall 16 positioned suitably interiorly of the extreme end of the body 11. To maintain the conductors 12 in suitable mutually insulated status at the respective ends of a unit, said conductors are necessarily relatively closely spaced. To allow for the passage of the blades of the attachment plug P at the inner sides of the conductors as shown in Figure 7, however, the spacing between said conductors must be increased at suitable locations; accordingly, each conductor is offset over suitable extent at its center portion, as appears from Figures 2 and 3.

The body 11 is a substantially hollow structure molded from plastic of suitable dielectric property. A suitable plurality of transversely extending walls 17 may be integral with the body 11. Said walls 17 may have bosses provided with a tapped hole, and additionally, grooves upon which the conductors 12 may be supported. Body 11 may also have transverse walls 18, 18 defining pockets 19 beneath apertures 20 in the front face of the housing, such apertures accommodating the blades of an attachment plug as illustrated in Figures 7 and 10. A longitudinal wall 18a cooperates with each pair of transverse walls 18 and the side walls of the housing 11 to bound such pockets 19 wholly by walls of electric insulation material.

Each conductor is provided with suitable contact means 21 having a springable blade portion 22 which is disposed within the respective pockets 19 beneath the apertures through the wall of the body 11. As illustrated in Figure 7, said blade portions 22 bear against the side wall of the body; when the blades of the contact plug P engage with such blade portions, they are urged outwardly to bear resiliently against the side walls of the body 11; the resistance to such displacement insures a tight frictional contact between the blades of the plug P and the blade portions 22 of the contacts 20.

The base 11a is desirably molded of electric insulation material and is given a central longitudinally extending rib 23 along the length of which are bosses 24 arranged to register with the bosses of the transverse ribs 17 of the body 11. The bosses of the said base 11a have a continuous passage therethrough, said passages accommodating a machine screw 25, see Figure 8, for screw threaded engagement with the bosses of the walls 17 to fasten the base 11a in position within the body 11. Preferably, base 11a is recessed, see Figs. 8 and 9, to accommodate the heads of such screws 25. Each end of the base 12 is formed with walls 26 spaced from said central rib 23 to provide channels 27 which tightly confine the conductors against the rib 17, see Fig. 8; such confinement, and the engagement of the conductors with the ends of said walls 26 at the offset portion of the conductors affords means of restraining the conductors against longitudinal movement during the stage of serially interconnecting the conductors of adjacent units. Obviously, to insure a tight fit which will produce proper electrical flow from one conductor to a conductor of an adjacent unit, the tapering, swaged end of a conductor must exert substantial endwise pressure on the adjacent conductor. The slope of the conductor at the offset portion thereof acts in camming relation with the end of the wall 26 to crowd the conductor against the rib 23. Such crowding action effectively restrains longitudinal movement of the conductor.

The base member 12 may advantageously have a plurality of pockets 28 arranged for disposition beneath the contacts 20 and accommodating the extreme end portions of the attachment plug blade, see Figure 10.

As is shown in Figure 4, the rib 23 is formed with a central bead 23a, the top of which is preferably in the plane of the surface of the bosses 24. It will also be noted from Figures 8 and 9 that the rib 23 extends well above the conductors 12, thereby forming an insulating barrier of substantial height and thickness between the conductors, eliminating electric leakage through "carbon tracking" or other circumstance. As appears in Figure 7, such insulating barrier is strengthened at the contact-receiving pocket areas by forming the central wall 18a in inverted U-shape, between the legs of which such beading 23a fits snugly. The interengagement of the legs of such U-shape barrier with the surface of the rib 23 and the bead 23a thereof precludes any accumulation of dirt, moisture, or other substance which may lead to electrical leakage, and the double wall 18a provides an impenetrable barrier against the jumping of a spark from one conductor to another during the engagement of the attachment plug blades with the contacts 20.

At the projecting end 14 of the body 11 and the corresponding end of the base 11a, registering bosses are provided, each having a passage 30 therethrough, said passages registering to provide a single aperture when the unit is assembled. At the opposite end of the body, the facing wall thereof has a hole 31 therethrough, such hole being so positioned that when the extension 14 of one unit is inserted into the socket 15 of an adjacent unit, the hole 31 is in registry with the passage 30, thereby allowing for a wood screw 13 or the like to pass through the interconnected units into the building wall to mechanically interconnect the stated units.

At the socket end 15, the conductors 12 are swaged to form a taper 12a projecting slightly beyond the end of the body 11, and suitably configurated to fit internally of the tubular end of a conductor of an adjacent unit. By swaging such conductor 12, the taper is formed without sacrifice of conductor material and the conduction of electricity from one to another unit is accomplished with minimum of resistance.

As is apparent from Fig. 2, the conductors 12, at the male end 14 of the unit, are flanked by an outer wall of electrical insulation material which completely protects the conductors against short circuit from external devices. The rib 23, disposed between such conductors when the unit is assembled, prevents the contact of one conductor with another, and minimizes electrical leakage from one conductor to the other.

Whereas I have discribed my invention by reference to specific forms thereof, it will be understood that many changes and modifications may be made without departing from the spirit of the invention.

I claim:

1. An electricity conductor unit comprising, in combination, a three-sided hollow body of electrical insulation material, means within said hollow body for supporting a plurality of electricity conductors in mutually insulated, spaced relationship, said conductors having terminals exposed at the ends of the body to afford seriatim electrical and mechanical interconnection with the electricity conductors of an adjacent unit, said conductors being angularly offset intermediate the ends thereof, and insulating closure means for said hollow body adapted to fit snugly against said conductors to confine the same within said hollow body, said closure means having a rib extending longitudinally thereof and positioned intermediate said conductors within the body to form an insulating wall therebetween, and wall means spaced from said central rib at the ends of said closure means and engaging said angularly offset portion of a conductor to cam said conductor against said central rib during a circumstance wherein said conductor is subjected to endwise pressure, thereby restraining said conductor against endwise displacement with respect to said hollow body.

2. An electricity conductor unit comprising, in combination, a substantially hollow body of electrical insulation material having paired apertures through a wall for the passage of the blades of an electric attachment plug, transverse walls disposed internally of said body and adapted to support electricity conductors, a plurality of walls of insulation material disposed at said apertures to provide an insulated pocket beneath said apertures, electricity conductors extending longitudinally of said body and supported on said transverse walls in mutually insulated spaced relationship, said conductors being offset in the zone of said body apertures to pass said apertures at the side thereof, and electric contact means on said conductors, said contact means having a contacting surface in registry with said apertures and a spring portion in contact with a side wall of said housing, whereby upon insertion of the blades of an attachment plug into said housing, said spring surface bears resiliently against the said housing wall to exert yielding reactive pressure on the blades of said attachment plug.

3. An electricity conductor unit comprising, in combination, a substantially hollow body of electrical insulation material having paired apertures through a wall for the passage of the blades of an electric attachment plug, transverse walls disposed internally of said body and adapted to support electricity conductors, a plurality of walls of insulation material disposed at said apertures to provide an insulated pocket beneath said apertures, electricity conductors extending longitudinally of said body and supported on said transverse walls in mutually insulated spaced relationship, said conductors being offset in the zone of said body apertures to pass said apertures at the side thereof, and electric contact means on said conductors, said contact means having a contact-affording surface extending outwardly and upwardly of said conductors, and terminating in a re-entrant, springable, curved portion engaging with a side wall of said housing, whereby upon insertion of the blades of an attachment plug into said housing, said spring surface bears resiliently against said housing wall to exert yielding reactive pressure on the blades of said attachment plug, the position of said conductor means with respect to the front wall of said housing being less than the depth of insertion of the blades of such attachment plug.

4. In an electricity conductor unit in which are electricity conductors having extending terminals for forcible insertion into complementary terminals of conductors of an adjacent unit to engage with said latter terminals with a tight frictional fit, the combination of a three sided hollow body of electrical insulation material, transverse walls disposed within said hollow body, rigid electricity conductors extending longitudinally of said body and supported on said transverse walls in insulated spaced relationship, said conductors being angularly offset in the central zone of said hollow body, closure means of electric insulation material for said hollow body, said closure means having a central longitudinally extending rib of height sufficient to extend at least to the upper surface of said conductor means and rigid wall means on said closure means spaced apart from said central rib to provide an open-ended channel substantially equal to the thickness of the conductor to receive an end of said conductor, an end of said wall means engaging with the offset portion of said conductor to restrain said conductor against endwise displacement with respect to said housing during the stage of connection with an adjacent unit.

JOSEPH F. O'BRIEN.